United States Patent
Abichaaya et al.

(10) Patent No.: US 9,168,796 B2
(45) Date of Patent: Oct. 27, 2015

(54) METHOD FOR EXCHANGING SIGNALS BETWEEN A TIRE PRESSURE SENSOR AND A CENTRAL PROCESSING UNIT IN A MOTOR VEHICLE

(75) Inventors: Elie Abichaaya, Jouy le Moutier (FR); Julien Reimon, Aulnay sous Bois (FR)

(73) Assignee: Johnson Controls Technology Company, Holland, MI (US)

( * ) Notice: Subject to any disclaimer, the term of this patent is extended or adjusted under 35 U.S.C. 154(b) by 401 days.

(21) Appl. No.: 13/522,173

(22) PCT Filed: Jan. 14, 2011

(86) PCT No.: PCT/EP2011/000136
§ 371 (c)(1),
(2), (4) Date: May 1, 2013

(87) PCT Pub. No.: WO2011/085991
PCT Pub. Date: Jul. 21, 2011

(65) Prior Publication Data
US 2013/0207798 A1     Aug. 15, 2013

(30) Foreign Application Priority Data
Jan. 15, 2010   (FR) ...................................... 10 50252

(51) Int. Cl.
*B60C 23/04*    (2006.01)
(52) U.S. Cl.
CPC ......... *B60C 23/0433* (2013.01); *B60C 23/0416* (2013.01)
(58) Field of Classification Search
CPC .................................................. B60C 23/0433
USPC .................................. 340/442, 444, 445, 447
See application file for complete search history.

(56) References Cited

U.S. PATENT DOCUMENTS

| | | | |
|---|---|---|---|
| 6,275,148 B1 | 8/2001 | Takamura et al. | |
| 2002/0084896 A1* | 7/2002 | Dixit et al. | 340/447 |
| 2003/0110851 A1 | 6/2003 | Tsujita | |
| 2005/0024194 A1* | 2/2005 | Ide | 340/445 |
| 2008/0129479 A1* | 6/2008 | Braun et al. | 340/447 |

FOREIGN PATENT DOCUMENTS

| | | |
|---|---|---|
| EP | 1 524 133 A1 | 4/2005 |
| FR | 2833523 A1 | 6/2003 |
| FR | 2844748 A1 | 3/2004 |

OTHER PUBLICATIONS

International Search Report dated Mar. 4, 2011 as received in corresponding PCT Application No. PCT/EP2011/000136, 4 pages.

* cited by examiner

*Primary Examiner* — Brent Swarthout
(74) *Attorney, Agent, or Firm* — Foley & Lardner LLP

(57) ABSTRACT

The invention provides a method of transmitting information in wireless manner by radio signals between a pressure sensor equipping a wheel of a motor vehicle and a central processor unit equipping said vehicle. The sensor transmits, for the attention of the central processor unit, firstly signals representative of digital data to be transferred to the central processor unit, and secondly a location signal used by the central processor unit to identify the vehicle wheel from which the digital data is coming. In accordance with the invention, the emission power of the location signal is lower than the emission power of the data transmission signals, and/or the duration of the location signal is adjusted in such a manner that the higher the speed of the vehicle the shorter the duration of the location signal. The invention is applicable to systems for monitoring the pressures of the tires of a vehicle.

8 Claims, 2 Drawing Sheets

METHOD FOR EXCHANGING SIGNALS BETWEEN A TIRE PRESSURE SENSOR AND A CENTRAL PROCESSING UNIT IN A MOTOR VEHICLE

CROSS REFERENCE TO RELATED APPLICATIONS

The present application is a National Stage of International Application No. PCT/EP2011/000136 filed on Jan. 14, 2011, which claims the benefit of France Patent Application No. 10 50252 filed on Jan. 15, 2010, the entire disclosures of which are incorporated herein by reference.

The invention relates to a method of interchanging information between a pressure and/or temperature sensor mounted in a wheel of a motor vehicle and a central processor unit equipping said vehicle.

BACKGROUND OF THE INVENTION

A system for monitoring the pressures of the tires of a motor vehicle comprises a pressure and/or temperature sensor mounted in each wheel of the vehicle, and a central processor unit that collects the data coming from each sensor by means of wireless links. Such a system makes it possible, in particular, to inform the driver of the vehicle whenever the pressure of a tire is abnormally low.

In practice, each sensor comprises a pressure and/or temperature probe, as well as a radio signal transmitter and a power supply battery. Pressure and temperature data is thus transmitted by each sensor and is collected by said central processor unit.

For that purpose, each sensor is provided with means for determining whether or not the wheel in which it is mounted is rotating. Those means may comprise an electronic accelerometer, of the micro-electromechanical system (MEMS) component type, that regularly evaluates the direction of gravity relative to a reference frame that is specific to it, thereby making it possible to determine that the wheel is rotating when the direction of gravity varies relative to the reference frame of the sensor, and that it is not rotating if said direction is constant.

Thus, in general, each sensor transmits pressure and/or temperature data while the wheel in which it is mounted is rotating, and does not transmit any such data whenever it evaluates that the wheel is stationary. That makes it possible to limit the electricity consumption of the sensor significantly throughout its life.

When a sensor is transmitting signals, said signals comprise firstly digital data transmission signals for transmitting digital data such as measured pressure and measured temperature, and secondly a "location" signal that is used by the central processor unit to identify the wheel in which the sensor transmitting that digital data is mounted. For example, the location signal is made up of a series of pulses transmitted at predetermined regular intervals.

In practical terms, the central processor unit identifies the wheels on the basis of their speeds of rotation that differ significantly from one wheel to another, to a small but real extent. These differences in speed are due, in particular, to the difference in the state of the road surface between a left wheel and a right wheel, to a wheel alignment or "tracking" defect, and to other parameters of that type that inevitably give rise to differences in speed of rotation of the wheels.

In practice, on the basis of the location signal, the central processor unit establishes an accurate estimate of the speed of rotation of the wheel carrying the sensor that generated the signal. The estimate is then compared with measurements of speeds of each wheel that are established and updated in parallel by an independent system such as an anti-lock braking system (ABS) with which the vehicle is equipped.

Finally, the central processor unit determines that the wheel from which the location signal is coming is the wheel that has the speed measured by the independent system that is the closest to the speed estimated accurately on the basis of the location signal.

Accurate estimation of the speed of the wheel on the basis of the location signal is, for example, achieved as described in Patent Application FR 2 833 523, i.e. with an algorithm that identifies a periodicity for the envelope curve of the location signal received by the central processor unit: the period of said envelope curve corresponds to the frequency of rotation of the wheel.

Another solution for accurately estimating the speed of the wheel on the basis of the location signal is given in Patent Application FR 2 844 748, that solution being based on the phase shift of that signal.

In practice, it appears that the sensors must transmit signals having relatively high power in order to obtain information transmission that is sufficiently reliable, which significantly limits the lives of the batteries equipping such sensors.

One of the solutions that makes it possible to increase the lives of the sensors consists in adding an additional antenna connected to the central processor unit by positioning it in such a manner as to improve the wireless transmission conditions. That makes it possible to reduce the emission power of the signals generated by the sensors, and thereby to increase the lives of the primary or secondary batteries of such sensors.

Unfortunately, adding an additional antenna gives rise to extra equipment cost and extra integration cost, which costs are prohibitive to implementing a pressure monitoring system.

OBJECT OF THE INVENTION

An object of the invention is to propose a solution making it possible to increase the lives of the batteries equipping the sensors.

SUMMARY OF THE INVENTION

To this end, the invention provides a method of transmitting information in wireless manner by radio signals between a pressure sensor equipping a wheel of a motor vehicle and a central processor unit equipping said vehicle, in which method the sensor transmits, for the attention of the central processor unit, firstly signals representative of digital data to be transferred to the central processor unit, and secondly a location signal used by the central processor unit to identify the vehicle wheel from which the digital data is coming, wherein the emission power of the location signal is lower than the emission power of the data transmission signals, and/or in that the duration of the location signal is adjusted in such a manner that the higher the speed of the vehicle the shorter the duration of the location signal.

With this solution, the energy used for transmitting the signals is reduced without adversely affecting the quality of the data interchange: since the emission power is maintained for the data interchange signals, the data continues to be transmitted by means of a link having optimum quality.

The invention also provides a method as defined above, wherein the location signal has an amplitude that is smaller than the amplitude of the data transmission signals.

The invention also relates to a method as defined above, wherein the location signal is made up of pulses that have durations shorter than the durations of the pulses forming the data transmission signals.

The invention also relates to a method as defined above, wherein the duration of the location signal is adjusted on the basis of an evaluation of the speed of rotation of the wheel that is made at the sensor.

The invention also relates to a method as defined above, wherein the evaluation of the speed of rotation of the wheel is made by determining a periodicity of data coming from an accelerometer integrated in the sensor.

DETAILED DESCRIPTION OF THE INVENTION

The basic idea of the invention is to decorrelate the characteristics of the data transmission signals from the characteristics of the location signals. This solution makes it possible to reduce the power of the location signals, which is not detrimental to estimating the speed of a wheel, and to maintain a higher emission power for the data transmission signals in such a manner as to guarantee satisfactory reliability for the data transmission.

The energy consumed by the sensors during the signal emission stage is thus obtained by reducing only the emission power of the location signals and/or by adjusting the duration of the location signals as a function of the actual speed of the vehicle during the transmission.

Figure 1:
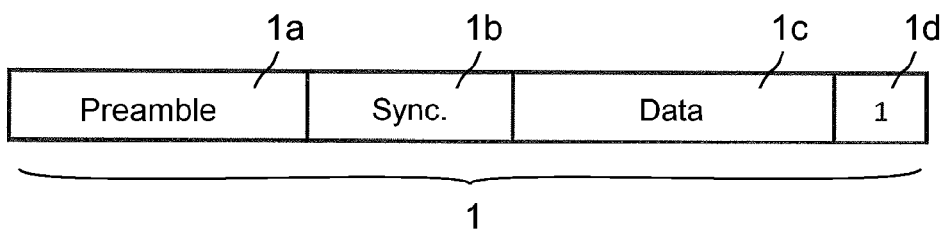
FIG. 1 is a diagram representing the contents of a digital data signal for digital data transferred between the sensor and the central processor unit.

A data signal, represented diagrammatically in FIG. 1 in which it is referenced 1, comprises a succession of binary words that, in this example, include a preamble 1a, a synchronization word 1b, a word representative of the transferred data 1c, and an end bit referenced 1d.

In the example shown in the figures, the preamble has a length lying in the range 24 bits to 904 bits, the synchronization word is transmitted over a duration of 0.624 milliseconds, and the data word has a length of 49 bits.

Figure 2:
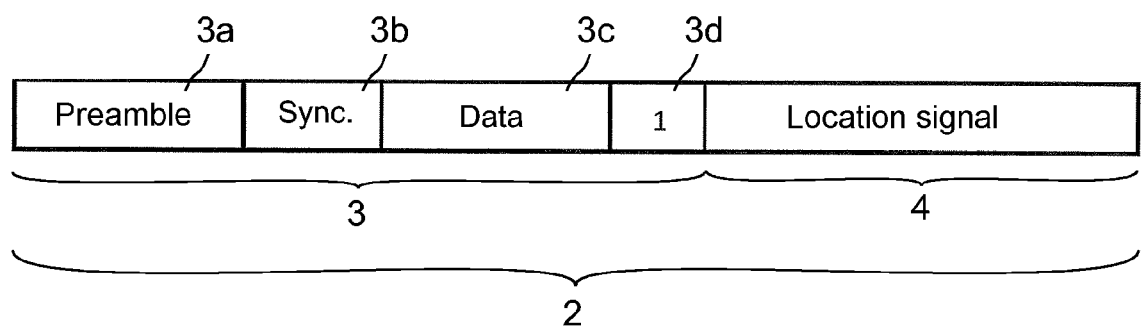
FIG. 2 is a diagram representing the contents of an identification signal that includes a digital data signal followed by a location signal that are transferred between the sensor and the central processor unit.

An identification signal transmitted by a sensor, which signal is represented in FIG. 2 while being referenced 2 therein comprises firstly a data signal referenced 3, and secondly a location signal referenced 4. The data signal 3 has content of the same type or format as the data signal 1: it too comprises a preamble 3a, a synchronization word 3b, a word representative of the transferred digital data 3c, and a final bit referenced 3d.

The digital data signal 1 is, for example, used for transferring the digital data representative of the temperature and of the pressure that are measured by the sensor, while the digital data signal 3 is integrated in the identification signal 2 so as to transfer, for example, an identifier number of the sensor.

As explained in the introduction of the present patent application, the location signal 4 is used by the central processor unit of the vehicle to identify the wheel that carries the sensor transmitting said signal. In the example shown in the figures, emission of the location signal extends over a duration of 294 milliseconds, and said location signal is, for example, made up of a series of pulses transmitted at regular intervals.

Thus, the use by the central processor unit of an identification signal 2 that it receives enables said central processor unit firstly to determine the identifier number of the sensor, and secondly to identify the wheel (front left, front right, rear left, rear right) in which the sensor is mounted.

Figure 3:
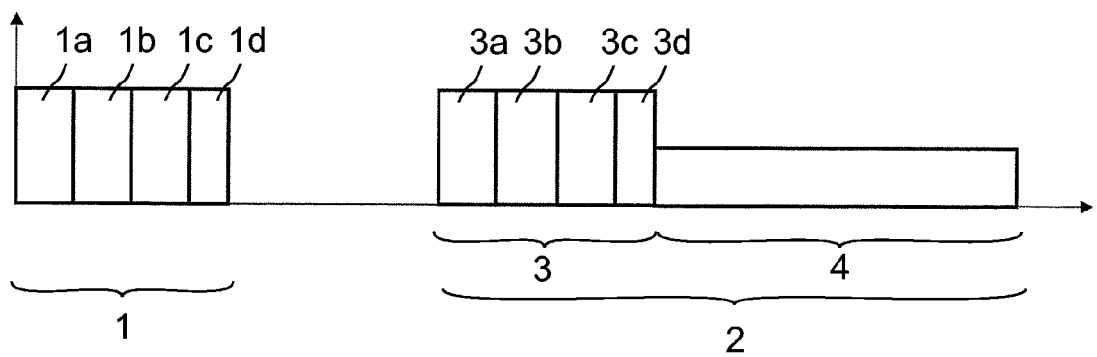
FIG. 3 is a graph showing how amplitude varies over time for the signals transmitted by the sensor for an entire transmission including transmission of digital data such as pressure followed by transmission of other digital data such as an identification number of the sensor and followed by emission of a location signal.

The life of the primary or secondary battery integrated in the sensor is increased by reducing the power of the location signal 4 relative to the power of the digital data transfer signals 1 or 3, as shown in FIG. 3.

It appears that the power of the location signal can be reduced without reducing the robustness of the estimate of the speed of rotation of the wheel, due to the fact that this estimate is performed statistically by the central processor unit. In other words, if certain bits or pulses of the location signal transmitted by the sensor are not received by the central processor unit, that does not normally have any effect on the estimate of the speed of the wheel by said central processor unit.

The power of the data processing signals 1 and 3 is maintained at a nominal level, insofar as the data transmission requires a higher level of transmission quality: the loss of one bit or of one pulse compromises the integrity of the entire set of transmitted data.

As shown in FIG. 3, reducing the power of the location signal 4 results in a reduction in the energy used for transmitting the location signal, and thus in a reduction in the energy necessary for each transmission from the sensor to the central processor unit.

More particularly, as shown in FIG. 3, a transmission from the sensor to the central processor unit comprises, in a first stage, a data signal 1 containing the measured values, such as pressure and temperature, and in a second stage, the identification signal 2 comprising, in a first stage, a data signal containing the identification number of the sensor and, in a second stage, a location signal enabling the central processor unit to determine the wheel with which the measurements are associated.

In the example shown in FIG. 3, the emission power of the location signal 4 is reduced by limiting the amplitude of each pulse that said signal includes.

It is also possible to reduce the power of the location signal 4 by reducing the duration of each pulse that said location signal includes, in addition to or in alternation with the reduction in amplitude of said pulses.

The reduction in the energy necessary for transmitting the location signal may also be obtained by adjusting the duration of the emission of said location signal, as a function of the speed of the vehicle.

The algorithms for estimating the speed of a wheel on the basis of the location signal transmitted by its sensor look for a periodicity of the envelope of such a signal or of its phase shift, and the period in question corresponds to the period of rotation of the wheel.

As a result, the longer the period in question the longer the duration of the location signal needs to be for such an algorithm. In practice, the duration of emission of the location signal is constant in known systems, and that constant duration conditions the minimum speed of the vehicle below which the speed of the wheel cannot be estimated with sufficient accuracy.

In accordance with the invention, the adjustment of the duration of emission of the location signal as a function of the speed of the vehicle constitutes another solution for achieving an overall reduction in the energy used by the sensors for generating the signals. This other solution may be implemented on its own or in combination with reducing the power of the location signal.

In this solution, by using the electronic accelerometer with which it is provided, the sensor roughly evaluates the speed of rotation of the wheel in which it is mounted. A duration of transmission of the location signal is then computed in the sensor, on the basis of the rough evaluation of the speed of rotation.

The rough evaluation of the speed of rotation is performed at the sensor, by roughly analyzing the variation in the direction of gravity relative to the local reference frame of the electronic accelerometer, for a certain time interval so as to look in said variation for an approximate periodicity that then corresponds to the period of rotation of the wheel.

More generally, the rough evaluation of the speed of rotation of the wheel is performed at the sensor while looking for a periodicity in the data delivered by the accelerometer component that it includes.

Figure 4:
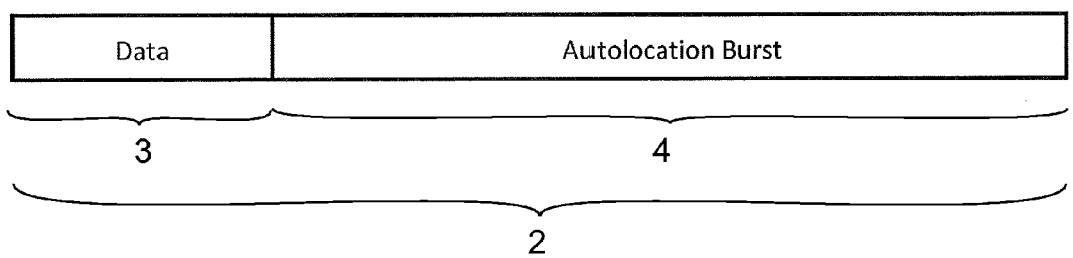
FIG. 4 is a diagram representing the duration of the location signal while the vehicle is traveling at low speed.
Figure 5:
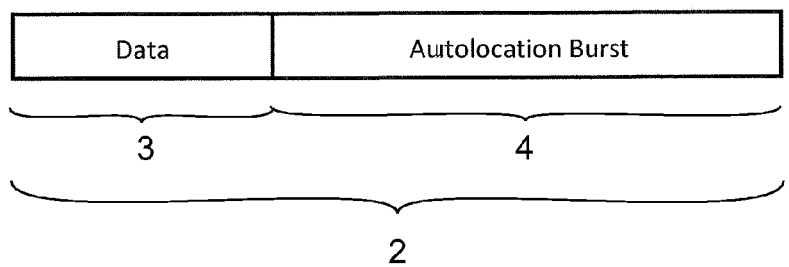
FIG. 5 is a diagram representing the duration of the location signal while the vehicle is traveling at high speed.

The higher the speed of the vehicle, the shorter the transmission duration for which the location signal is transmitted by the sensor, which duration is computed at the sensor. By way of example, FIG. 4 shows an identification signal 2 corresponding to a situation in which the speed of the vehicle is low, so that the location signal 4 has a long duration. Conversely, FIG. 5 shows an identification signal 2 corresponding to a situation in which the speed of the vehicle is high, so that the location signal has a duration that is much shorter.

As shown in FIG. 3, the sensor then transmits a data signal 1 containing the measured pressure and/or the measured temperature, and then an identification signal 2 containing firstly a data signal 3 including an identifier number for identifying the sensor, followed by a location signal 4 transmitted for the duration that is previously computed on the basis of the rough evaluation of the speed.

Thus, by means of this solution, the duration of the location signal 4 is significantly reduced whenever the vehicle has a high speed, thereby resulting in a corresponding reduction in the energy consumed by the sensors during the emission stage.

In addition, this solution makes it possible to increase the emission duration significantly so that the speed of the wheel can be estimated on the basis of the location signal received by the central processor unit, including when the speed of the vehicle is very low, i.e., for example, less than 30 kilometers per hour (km/h).

In practical terms, this adjustment in the emission duration as a function of the actual speed of the vehicle during the transmission allows the pressure detection system to operate normally, including in a vehicle driving in a built-up area, in a traffic jam, i.e. at a low speed.

In general, it should be noted that, in the above-described example, the sensor transmits successively a data signal followed by an identification signal, but these two transmissions are not necessarily correlated, and, on the contrary, they can take place completely independently over time. Thus, the identification signals can be transmitted much less frequently than the pressure and temperature data.

The invention claimed is:

1. A method of transmitting information in a wireless manner by radio signals between a pressure sensor equipping a wheel of a motor vehicle and a central processor unit equipping said vehicle, the method comprising:
   transmitting, by the sensor, for attention of the central processor unit, data transmission signals representative of digital data to be transferred to the central processor unit, and a location signal used by the central processor unit to identify the wheel from which the digital data is generated,
   wherein an emission power of the location signal is lower than an emission power of the data transmission signals.

2. A method according to claim 1, wherein a duration of the location signal is adjusted such that as a speed of the vehicle increases, the duration of the location signal decreases.

3. A method according to claim 1, wherein the location signal has an amplitude that is smaller than an amplitude of the data transmission signals.

4. A method according to claim 1, wherein the location signal comprises pulses which are shorter in duration than pulses of the data transmission signals.

5. A method according to claim 4, wherein a duration of the location signal is adjusted on the basis of an evaluation of a speed of rotation of the wheel, which evaluation is performed by the sensor.

6. A method according to claim 4, wherein an evaluation of a speed of rotation of the wheel is made by determining a periodicity of data from an accelerometer integrated in the sensor.

7. A method of transmitting information in wireless manner by radio signals between a pressure sensor equipping a wheel of a motor vehicle and a central processor unit equipping said vehicle, in which method the sensor transmits, for the attention of the central processor unit, firstly signals representative of digital data to be transferred to the central processor unit, and secondly a location signal used by the central processor unit to identify the vehicle wheel from which the digital data is coming,
   wherein the emission power of the location signal is lower than the emission power of the data transmission signals and/or the duration of the location signal is adjusted in such a manner that the higher the speed of the vehicle the shorter the duration of the location signal,
   wherein the location signal has an amplitude that is smaller than the amplitude of the data transmission signals.

8. A method of transmitting information in wireless manner by radio signals between a pressure sensor equipping a wheel of a motor vehicle and a central processor unit equipping said vehicle, in which method the sensor transmits, for the attention of the central processor unit, firstly signals representative of digital data to be transferred to the central processor unit, and secondly a location signal used by the central processor unit to identify the vehicle wheel from which the digital data is coming,
   wherein the emission power of the location signal is lower than the emission power of the data transmission signals and/or the duration of the location signal is adjusted in such a manner that the higher the speed of the vehicle the shorter the duration of the location signal,
   wherein the location signal is made up of pulses that have durations shorter than the durations of the pulses forming the data transmission signals.

* * * * *